US010565658B1

(12) United States Patent
Harvey et al.

(10) Patent No.: US 10,565,658 B1
(45) Date of Patent: *Feb. 18, 2020

(54) METHOD AND SYSTEM FOR DETERMINING THE CONDITION OF INSURED PROPERTIES IN A NEIGHBORHOOD

(71) Applicant: STATE FARM MUTUAL AUTOMOBILE INSURANCE COMPANY, Bloomington, IL (US)

(72) Inventors: Brian N. Harvey, Bloomington, IL (US); Nathan L. Tofte, Downs, IL (US); Roger D. Schmidgall, Normal, IL (US); Michael Jeffrey Aviles, Bloomington, IL (US); Kyle Pott, Bloomington, IL (US); Rosemarie Geier Grant, Ellsworth, IL (US); Michael Shawn Jacob, Le Roy, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 242 days.

This patent is subject to a terminal disclaimer.

(21) Appl. No.: 15/837,649

(22) Filed: Dec. 11, 2017

Related U.S. Application Data (63) Continuation of application No. 14/510,307, filed on Oct. 9, 2014, now Pat. No. 9,875,509.

(51) Int. Cl.
*G06Q 40/08* (2012.01)
*G06T 17/20* (2006.01)
*G06K 9/00* (2006.01)

(52) U.S. Cl.
CPC ......... *G06Q 40/08* (2013.01); *G06K 9/00637* (2013.01); *G06T 17/20* (2013.01); *G06T 2210/04* (2013.01)

(58) Field of Classification Search
None
See application file for complete search history.

(56) References Cited

U.S. PATENT DOCUMENTS 7,809,587 B2   10/2010  Dorai et al.
8,346,578 B1 *  1/2013  Hopkins, III ......... G06Q 40/00
                                                      382/100

(Continued)

OTHER PUBLICATIONS

Grubesic, "Using unmanned aerial systems for remotely sensing physical disorder in neighborhoods" Landscape and Urban Planning, vol. 169, Jan. 2018, pp. 148-159 (Year: 2018).*

(Continued)

*Primary Examiner* — Bruce I Ebersman
*Assistant Examiner* — David P Sharvin
(74) *Attorney, Agent, or Firm* — Marshall, Gerstein & Borun LLP (57) ABSTRACT

A method and system may determine the condition of insured properties in a neighborhood using aerial images captured from an unmanned aerial vehicle (UAV) or from a satellite device. The neighborhood may be selected by identifying a neighborhood that includes properties which are insured by a particular insurance provider. Aerial images of the entire neighborhood may then be captured and received from the UAV or the satellite device. For each insured property in the neighborhood, a condition and level of risk may be automatically determined based on the received aerial images. Then a level of risk indicator may be assigned to the insured property based on the determined level of risk. The aerial images of the insured property may (Continued)

be displayed on a user interface with indications of the level of risk overlaying the aerial images.

20 Claims, 6 Drawing Sheets

(56) References Cited

U.S. PATENT DOCUMENTS

| | | | |
|---|---|---|---|
| 8,380,454 B2* | 2/2013 | Holmes | G01R 35/04 702/87 |
| 8,666,786 B1 | 3/2014 | Wirz et al. | |
| 8,756,085 B1 | 6/2014 | Plummer et al. | |
| 8,818,572 B1 | 8/2014 | Tofte et al. | |
| 8,872,818 B2 | 10/2014 | Freeman et al. | |
| 8,874,454 B2 | 10/2014 | Plummer et al. | |
| 9,002,719 B2 | 4/2015 | Tofte | |
| 9,262,789 B1 | 2/2016 | Tofte | |
| 9,489,696 B1 | 11/2016 | Tofte | |
| 9,612,598 B2 | 4/2017 | Schultz et al. | |
| 9,633,146 B2 | 4/2017 | Plummer et al. | |
| 2007/0070185 A1 | 3/2007 | Dy et al. | |
| 2007/0260401 A1* | 11/2007 | Sydor | G06Q 40/08 702/1 |
| 2009/0265193 A1* | 10/2009 | Collins | G06Q 30/0185 705/4 |
| 2012/0033851 A1 | 2/2012 | Chen et al. | |
| 2014/0019166 A1 | 1/2014 | Swanson et al. | |
| 2014/0100889 A1 | 4/2014 | Tofte | |
| 2014/0245210 A1 | 8/2014 | Battcher et al. | |
| 2014/0259549 A1 | 9/2014 | Freeman et al. | |
| 2014/0270492 A1 | 9/2014 | Christopulos et al. | |
| 2014/0278573 A1 | 9/2014 | Cook | |
| 2014/0278587 A1 | 9/2014 | Plummer et al. | |
| 2014/0320651 A1 | 10/2014 | McClatchie et al. | |
| 2014/0334689 A1 | 11/2014 | Butler et al. | |

OTHER PUBLICATIONS

U.S. Appl. No. 14/510,492 entitled "Method and System for Assessing Damage to Insured Properties in a Neighborhood," filed Oct. 9, 2014.

U.S. Appl. No. 14/510,536 entitled "Method and System for Generating Real-Time Images of Customer Homes During a Catastrophe," filed Oct. 9, 2014.

U.S. Appl. No. 14/510,784 entitled "Method and System for Assessing Damage to Infrastructure," filed Oct. 9, 2014.

Samadzadegan et al., "Earthquake destruction assessment of urban road network using satellite imagery and fuzzy interference systems," Proc. The International Archives of the Photogrammetry, Remote Sensing and Spatial Information Sciences, 2008, pp. 409-414.

Atkins et al., "An Integrated damage, visual, and radar analysis of the 2013 Moore Oklahoma EF5 tornado," American Meteorological Society, Jul. 2014.

Li et al., "Study on road damage assessment based on RS and GIS," IGARSS 2010.

Yamazaki, "Applications of remote sensing and GIS for damage assessment," In: ICUS/INCEDE Report 1, Joint Workshop on Urban Safety Engineering, Bangkok, 2001.

Office Action issued in U.S. Appl. No. 14/510,784 dated Nov. 25, 2014.

Office Action issued in U.S. Appl. No. 14/510,492 dated Jan. 8, 2015.

Office Action issued in U.S. Appl. No. 14/510,536 dated Dec. 23, 2015.

Office Action issued in U.S. Appl. No. 14/510,492 dated Jul. 15, 2015.

Office Action issued in U.S. Appl. No. 14/510,536 dated Jul. 6, 2015.

Office Action issued in U.S. Appl. No. 14/510,536 dated Nov. 27, 2015.

Office Action issued in U.S. Appl. No. 14/808,502 dated Nov. 27, 2015.

Gong et al. "Road damage detection from high-resolution RS image," IGARSS 2012.

Wang et al., "An object oriented method for road damage detection from high resolution remote sensing images," 19th International Conference on Geoinformatics, 2011.

Liu et al., "Object-oriented remote sensing image classification and road damage adaptive extraction," RSETE 2013.

Office Action issued in U.S. Appl. No. 14/510,492 dated Jul. 12, 2016.

Office Action issued in U.S. Appl. No. 14/510,536 dated May 25, 2016.

U.S. Appl. No. 15/165,457, filed May 26, 2016.

U.S. Appl. No. 15/718,323, filed Sep. 28, 2017.

Office Action issued in U.S. Appl. No. 15/718,323 dated Oct. 26, 2017.

Brunner at al., "Earthquake damage assessment of building using VHR optical and SAR Imagery," IEEE Transactions on Geoscience and Remote Sensing, vol. 48, No. 5, May 2010.

* cited by examiner

FIG. 1A

CLIENT DEVICE

METHOD AND SYSTEM FOR DETERMINING THE CONDITION OF INSURED PROPERTIES IN A NEIGHBORHOOD

RELATED APPLICATIONS

This application is a continuation of and claims priority to U.S. application Ser. No. 14/510,307, filed on Oct. 9, 2014, entitled "Method and System For Determining the Condition of Insured Properties in a Neighborhood," the entire disclosure of which is hereby expressly incorporated by reference.

TECHNICAL FIELD

The present disclosure generally relates to a method and system for determining the conditions of insured properties in a neighborhood and, more particularly to a method and system for performing underwriting by determining risk and exposures of insured or potentially insured properties.

BACKGROUND

During the underwriting process for property insurance, insurance companies evaluate the risk and exposures of potential or current customers. In order to evaluate this risk, the insurance companies assign an agent to investigate the property of a potential customer to determine the risk and exposures of the property and to determine an appropriate premium that is commensurate with the exposure presented by the risk.

Often, the property investigations can be time-consuming, difficult and even dangerous for the insurance agents. For example, in order to investigate the risk and exposures of a home owner's roof, an agent may have to climb onto the roof, and perform inspections while on the owner's roof. By climbing on the roof and attempting to maneuver around the roof to perform his inspection, the insurance agent opens himself to a real risk of injury, especially in difficult weather conditions where the roof may be slippery because of rain, snow, and/or ice and winds may be severe.

Even if the insurance agent performs the inspection without getting injured, performing the full investigation may still be time-consuming. In addition to the time required to drive to and from the property and to perform the inspection itself, significant paperwork and calculations may be involved in calculating premium for the customers. For example, if an insurance agent takes photos on the roof of a customer's building in order to calculate the appropriate premium commensurate with the risk presented by the condition of the roof, the agent may have to come back to his office, research the customer's property, compare the condition of the customer's property to similar properties in good condition and determine the level of risk associated with the customer's property. All of these steps are time consuming and both delay issuing an insurance policy to a customer and prevent the agent from performing underwriting for other customers.

SUMMARY

To perform underwriting of insured or potentially insured properties in a neighborhood, an automated insurance underwriting system may identify a neighborhood with a large concentration of properties which are insured or potentially insured by an insurance company. For example, the system may identify a neighborhood where over 20 percent of the properties within the neighborhood are either insured or potentially insured by the insurance company. Once the neighborhood is identified, the system may perform all insurance underwriting for the properties in a single, automatic inspection, for example by automatically surveying the entire neighborhood at once, instead of one property at a time.

The automatic inspection may be performed by an unmanned aerial vehicle (UAV) or by a swarm of UAVs working together, which may be controlled by an insurance agent or by the system and flown all over the neighborhood to capture aerial images of the properties. Alternatively, the automatic inspection may be performed by a satellite which also captures aerial images of the properties within the neighborhood. Moreover, the inspection may also be performed by a manned aerial vehicle (MAV) which captures aerial images of the properties while flying over the neighborhood. Each captured aerial image may be associated with a location, for example a GPS location, and the GPS location may be used to determine the owner of the property which is displayed in the captured aerial image. If the property owner is insured by the insurance company, the aerial image may be used to determine the condition of the property as well as a level of risk associated with the property. In this manner, the underwriting can be performed for an insured property without requiring an insurance agent to spend time and risk injury by inspecting the property. Moreover, the system provides a speedy and efficient method of performing underwriting by investigating an entire neighborhood in one inspection rather than investigating one insured property at a time.

In an embodiment, a method for determining the condition of insured properties using aerial images is provided. The method includes identifying that a neighborhood includes properties insured by an insurance provider, capturing, by an aerial image capturing device, a plurality of aerial images which display the neighborhood including the insured properties, and receiving a plurality of aerial images from the aerial image capturing device. For each of the insured properties in the identified neighborhood, the method includes determining a condition of the insured property based on one or more of the plurality of aerial images corresponding to the insured property, and determining a level of risk of the insured property based on the condition of the insured property and a change in the condition of the insured property over time, where the level of risk of the insured property differs according to a length of time that the insured property is in a particular condition. The method further includes assigning a level of risk indicator to the insured property based on the determined level of risk, and causing the insured property to be displayed on a user interface including the level of risk indicator overlaying the insured property. Additionally, the one or more processors automatically direct the aerial image capturing device to capture the plurality of aerial images which display the neighborhood.

In another embodiment, a system for determining the condition of insured properties using aerial images is provided. The system includes an aerial image capturing device which captures a plurality of aerial images that display insured properties, a user interface, a communication network, and one or more computing devices communicatively coupled to the communication network, the aerial image capturing device, and the user interface. At least one of the computing devices is configured to identify that a neighborhood includes properties insured by an insurance provider and receive a plurality of aerial images via the communication network from the aerial image capturing device. For each of the insured properties in the identified neighborhood, at least one of the computing devices is configured to determine a condition of the insured property based on one or more of the plurality of aerial images corresponding to the insured property, and determine a level of risk of the insured property based on the condition of the insured property and a change in the condition of the insured property over time, where the level of risk of the insured property differs according to a length of time that the insured property is in a particular condition. At least one of the computing devices is further configured to assign a level of risk indicator to the insured property based on the determined level of risk, and cause the insured property to be displayed on the user interface including the level of risk indicator overlaying the insured property. Additionally, at least one of the computing devices automatically directs the aerial image capturing device to capture the plurality of aerial images which display the neighborhood.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, the term "aerial image" as used herein, may be used to refer to any image data within the electromagnetic spectrum (i.e. including the visible light spectrum as well as the invisible light spectrum), which is captured from an elevated position. Aerial images may include visible light imaging, radar imaging, near infrared imaging, thermal infrared imaging, hyperspectral imaging, multispectral imaging, full spectral imaging, etc. For example, an image captured by a satellite, a manned aerial vehicle (MAV) or an unmanned aerial vehicle (UAV) may be referred to herein as an "aerial image." An aerial image may be made up of data points, for example pixel data points, where each data point may correspond to a specific global positioning system (GPS) location. An aerial image may also include video captured from an elevated position.

As used herein, the term "insured property" may be used to refer to any property which is insured by an insurance provider. "Insured property" may include property which requires re-underwriting, because for example the insurance on the property is up for renewal or circumstances have changed in such a manner that the insurance provider requires re-underwriting. The term "potentially insured property" may be used to refer to property which the owner would like to have insured by the insurance provider, but which must go through the underwriting process first before an appropriate premium can be determined and the property can be insured. For ease of discussion only and not for purposes of limitation, only insured properties are mentioned below. However, the insured properties described below may also include potentially insured properties.

The term "insurance provider" as used herein, generally refers to a party or entity (e.g., a business or other organizational entity) that provides insurance products, e.g., by offering and issuing insurance policies. Typically, but not necessarily an insurance provider may be an insurance company. Further, an insurance provider can be any individual, group of individuals, company, corporation, or other type of entity that can issue insurance policies for customers, such as insurance policies associated with properties.

An insurance provider may offer or provide one or more different types of insurance policies. Types of insurance policies may include, for example, homeowner's insurance; condominium owner's insurance; renter's insurance; business insurance (e.g., property, liability, inland marine and mobile property, etc.); insurance for catastrophic events such as flood, fire, volcano damage, etc.; personal liability insurance; and other types of insurance products. In embodiments as described herein, the insurance providers initiate and/or process claims related to insurance policies that cover one or more properties (e.g., homes, condominiums, apartments, etc.).

Generally speaking, to perform the automatic underwriting process, an aerial image capturing device which may be a satellite, MAV, or one or several UAV(s) is/are directed to capture images within an identified neighborhood having a large percentage of properties which are insured by an insurance provider. The aerial image capturing device may be directed by a client device having user controls for determining the location and the amount of photographs or video that is captured. The captured aerial images may then be provided to the client device or to a server computer and grouped based on their GPS locations to determine a group of aerial images which correspond to an insured property. Each group of aerial images corresponding to an insured property may be aggregated, for example using photogrammetry, to create a 3-dimensional (3D) image of the insured property.

The 2D or 3D image may be displayed on the client device and may be created at a predefined level of detail (e.g., accurate to within ten percent) and/or may be adjustable (e.g., a user of the system may be able to "zoom in" or "zoom out" of the image). Moreover, the 2D or 3D image may be broken down into property components, such as a roof, a door, siding, an exterior wall, a front lawn, a backyard, an outdoor swimming pool, a fence, a tree, a deck, a patio, etc. Each of these property components may then be compared to other images of the same respective property component for determining the condition of the component. For example, an image of the roof may be compared to an image of the roof taken ten years ago or to an image of a perfectly intact roof. The condition of each property component may be used to determine a level of risk associated with the component. Moreover, the level of risk may be determined independently of the condition of the property component. For example, a house with a swimming pool may create some risk of liability regardless of the condition of the swimming pool. The level of risk of each property component may be aggregated or combined for an insured property to determine an overall level of risk for the property. This overall level of risk may be provided to an insurance agent, for example, on the user interface of the client device for determining an appropriate insurance premium based on the level of risk. Alternatively, the client device or the server computer may automatically determine an appropriate insurance premium based on the determined overall level of risk.

Figure 1A:
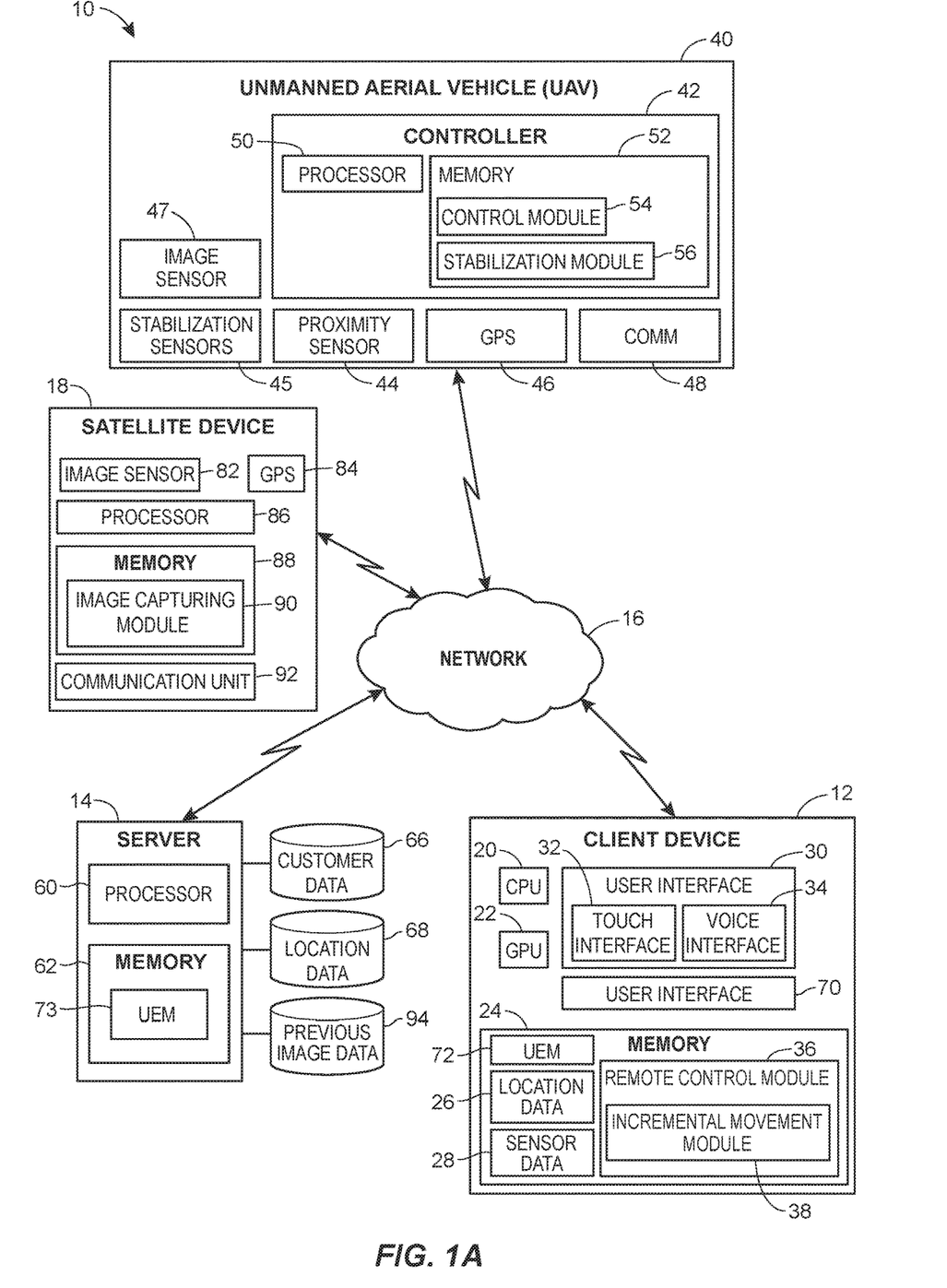
FIG. 1A illustrates a block diagram of an example system in which techniques for performing automatic underwriting of insured properties in a neighborhood are implemented.
Figure 1B:
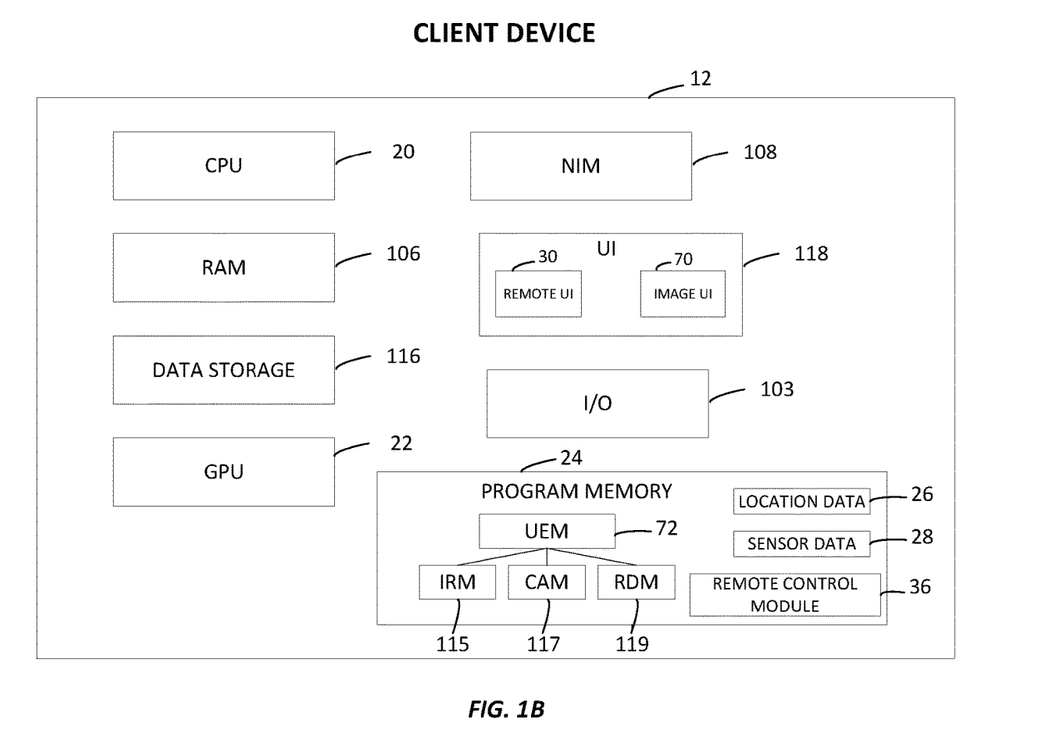
FIG. 1B illustrates a block diagram of an exemplary mobile device.

FIG. 1A illustrates various aspects of an exemplary environment implementing an automated insurance underwriting system 10 (also referred to herein as "the system"). The system 10 may include a client device 12 with remote control capabilities coupled to one or several unmanned aerial vehicles (UAVs) 40, an MAV, a satellite device 18, and a server 14 via a communication network 16. The client device 12 may be, for example, a laptop computer, a tablet computer, a smartphone, a wearable device, etc. In the embodiment illustrated in FIG. 1A, the client device 12 may include a central processing unit (CPU) 20, a graphics processing unit (GPU) 22, a computer-readable memory 24, and a first user interface 30 for controlling the UAV(s) 40 or the satellite device 18. The first user interface 30 may include a touch interface 32, voice interface 34, etc. In various implementations, the touch interface 32 can include a touchpad over which the user moves his fingers while looking at a separately provided screen, a touchscreen where the user places his fingers directly over the image being manipulated or over a displayed control being activated (e.g. a displayed keyboard), etc. In other implementations, the voice interface 34 may include any device that includes a microphone, such as a Bluetooth ear piece, a smartphone, etc. The client device 12 may further include a second user interface 70 which may be used for viewing aerial images captured by the UAV(s) 40, MAV, or the satellite device 18. In some embodiments, the first user interface 30 and the second user interface 70 may be implemented on one user interface which includes user controls for directing the UAV(s) 40 or the satellite device 18 and displays the aerial images after the aerial images have been captured. The memory 24 is a computer-readable non-transitory storage device that may include both persistent (e.g., a hard disk) and non-persistent (e.g., RAM) memory components, stores instructions executable on the CPU 20 and/or the GPU 22 that make up an underwriting evaluation module (UEM) 72, a remote control module 36 and location data 26 and sensor data 28 on which the remote control module 36 operates. The remote control module 36 includes an incremental movement module 38 that allows a user to easily control the UAV(s) 40 via step-like, incremental movements in which one incremental movement is in response to one single user command.

The remote control module 36 and the underwriting evaluation module 72 according to various implementations operate as separately executable software applications, plugins that extend the functionality of another software application such as a web browser, application programming interfaces (API) invokable by a software application, etc. The instructions that make up the remote control module 36 and the underwriting evaluation module 72 may be compiled and executable on the CPU 20 and/or the GPU 22 directly, or not compiled and interpreted by the CPU 20 at runtime. However, FIG. 1A merely illustrates a condensed version of the client device 12, and a more detailed version of the client device 12 is described below with reference to FIG. 1B.

Referring still to FIG. 1A, each UAV 40 includes a controller 42 that communicates with one or more proximity sensors 44, one or more stabilization sensors 45, a Global Positioning System (GPS) unit 46, an image sensor 47, and a communications unit 48. The image sensors 47 may include one or more filters for infrared imaging, hyperspectral imaging, multispectral imaging, full spectral imaging, etc., or alternatively, the image sensors 47 may include one or more sensors which receive image data outside of the visible light spectrum such as an infrared image sensor. The controller 42 includes a processor 50 that executes instructions from a computer-readable memory 52 to implement a control module 54 and a stabilization module 56. The control module 54 may invoke the stabilization module 56 to retrieve data from the stabilization sensors 45 (i.e., sensors relating avionics) to implement a control function, such as that associated with a control routine that performs PID (proportional-integral-derivative), fuzzy logic, nonlinear, etc. control to maintain the stability of the UAV(s) 40. For instance, the stabilization sensors 45 may include one or more of a directional speed sensor, a rotational speed sensors, a tilt angle sensor, an inertial sensor, an accelerometer sensor, or any other suitable sensor for assisting in stabilization of an aerial craft. Of course, the stabilization module 56 may implement any suitable technique of stabilizing the remote aerial device 40 in a hover or stationary three dimensional position.

The control module 54 may retrieve data from the proximity sensors 44. These proximity sensors 44 may include any sensor or technique that assists the control module 44 in determining a distance and a direction to the insured properties within the neighborhood. The one or more proximity sensors 44 may include optic flow sensors, ultrasonic sensors, infrared sensors, LIDAR (Light Detection and Ranging), a stereo vision system (SVS) that may utilize the image sensors 47 (e.g., one or more cameras) to implement stereoscopic imaging techniques to capture aerial images of the neighborhood including the insured properties and to create 3D images of the insured properties. The control module 54 may also receive instructions from the client device 12 to capture aerial images at specific locations or time intervals.

The GPS unit 46 may use "Assisted GPS" (A-GPS), satellite GPS, or any other suitable global positioning protocol or system that locates the position of the UAV(s) 40. Moreover, the GPS unit 46 may also determine the position of the aerial images or of data points within the aerial images captured by the UAV(s) 40, or the GPS may be combined with the distance and direction sensors 44 to determine the position of the aerial images, and positions of data points within an aerial image. For example, A-GPS utilizes terrestrial cell phone towers or wi-fi hotspots (e.g., wireless router points) to more accurately and more quickly determine the location of the device while satellite GPS generally are more useful in more remote regions that lack cell towers or wi-fi hotspots. The communication unit 48 may communicate with the server 14 or the client device 12 via any suitable wireless communication protocol network, such as a wireless telephony network (e.g., GSM, CDMA, LTE, etc.), a wi-fi network (802.11 standards), a WiMAX network, a Bluetooth network, etc.

As mentioned above, the system 10 may also include a satellite device 18 which includes an image sensor 82 for capturing aerial images and a GPS unit 84 for determining the position of each image. For example, the satellite device 18 may determine GPS coordinates of the boundaries of an aerial image, and also may determine GPS coordinates of data points, such as pixel data points, of the aerial image. The satellite device 18 may also include a processor 86 which executes instructions from a computer-readable memory 88 to implement an image capturing module 90, which may capture and transmit satellite images at the request of the client device 12. For example, the client device 12 may request satellite images between specified GPS coordinates, and the image capturing module 90 may transmit satellite images within the specified coordinates. Moreover, in some embodiments the client device 12 may specify the number of satellite images for the image capturing module 90 to capture and the zoom level. The client device 12 or the server 14 and the satellite device 18 may communicate via a communication unit 92 via any suitable wireless communication protocol network, such as a wireless telephony network (e.g., GSM, CDMA, LTE, etc.), a wi-fi network (802.11 standards), a WiMAX network, a Bluetooth network, etc.

The server 14 may include insurance data (e.g., customer biographical information, type of property, etc.), location data (e.g., a property location of a customer, etc.), and previous image data (e.g., aerial images of insured properties taken at an earlier date) from a customer database 66, a location database 68, and a previous image database 94, respectively. The server 14 then may provide the customer data, the location data, the previous image data, and appropriate indications of how certain portions of the customer data and the location data are linked, to the client device 12 as part of the location data 26. The client device 12 may use this location data to determine a geographic location that the UAV(s) 40 is/are initially sent to and may use the previous image data to determine a condition of an insured property as compared to its previous condition. Of course, the customer database 66, the location database 68, and the previous image database 94 may be disposed within the client device 12 depending on the implementation. The server may also include a processor 60 which executes instructions from a computer-readable memory 62 to implement an underwriting evaluation module 73, which may be the same as the underwriting evaluation module 72 of the client device 12. In some embodiments, the underwriting evaluation module 72 may be disposed in the client device 12, in the server 14 or in a combination of the server 14 and the client device 12.

FIG. 1B illustrates the client device 12 of FIG. 1A in further detail. As illustrated in FIG. 1A, the client device may include a CPU 20, a GPU 22, and a memory 24 which may be a hard drive, an optical drive, a solid state memory device, or any other non-volatile memory device. The client device 12 may further include an input/output (I/O) unit 103 and a data storage 116, which may include customer data, location data, previous image data, etc., which may be retrieved from software instructions which may be stored in the memory 24. During execution, the software instructions may be stored in, and may store and retrieve data from, a volatile or non-volatile memory source, such as a random access memory (RAM) 106. The client device 12 may include a network interface module (NIM) 108 for wired and/or wireless communications. The network interface module 108 may allow the device to communicate with one or more other devices such as the server 14, the satellite device 18, the MAV, or the UAV(s) 40 of FIG. 1A, by using one or more of any number of communications protocols including, by way of example and not limitation, Ethernet, cellular telephony, IEEE 802.11 (i.e., "Wi-Fi"), Fibre Channel, etc. The memory 24 may store an underwriting evaluation module 72 as described above. The underwriting evaluation module 72 may be a sub-routine of a software application or may be an independent software routine in and of itself. Alternatively, in some implementations, the underwriting evaluation module 72 may be a hardware module or a firmware module. The underwriting evaluation module 72 may include compiled instructions directly executable by the CPU 20, scripted instructions that are interpreted at runtime, or both.

The client device may also include a user interface (UI) 118 which includes the remote user interface 30 and the image user interface 70 of FIG. 1A. The remote user interface 30 may include user controls for directing the UAV(s) 40, for requesting aerial images from the MAV or for requesting satellite images from the satellite device 18 at specific locations. On the other hand, the image user interface 70 may display aerial images of insured properties within a neighborhood and may also display levels of risk for property components of the insured properties.

The underwriting evaluation module (UEM) 72 may contain one or more of an image receiving module (IRM) 115, a condition assessment module (CAM) 117, and/or a risk determination module (RDM) 117. The UEM 72 may determine an overall level of risk associated with each insured property in a neighborhood according to the presently described techniques. In some embodiments, the UEM 72 may determine a level of risk associated with one or more property components of an insured property. More specifically, the UEM 72 may automatically determine the condition of insured properties based on stored and received aerial images and/or other data describing property such as residential or commercial buildings. The aerial images may be stored in the memory 24 and/or RAM 106. In instances where the UEM 72 executes on a server device, the level of risk for an insured property may be transmitted to the client device 12. Additionally, the UEM 72 may perform certain calculations on the server device 14 of FIG. 1A while other calculations are performed on the client device 12. Moreover, the memory 24, may also include a remote control module 36 and location data 26 and sensor data 28 on which the remote control module 36 operates as described above with reference to FIG. 1A.

Figure 2:
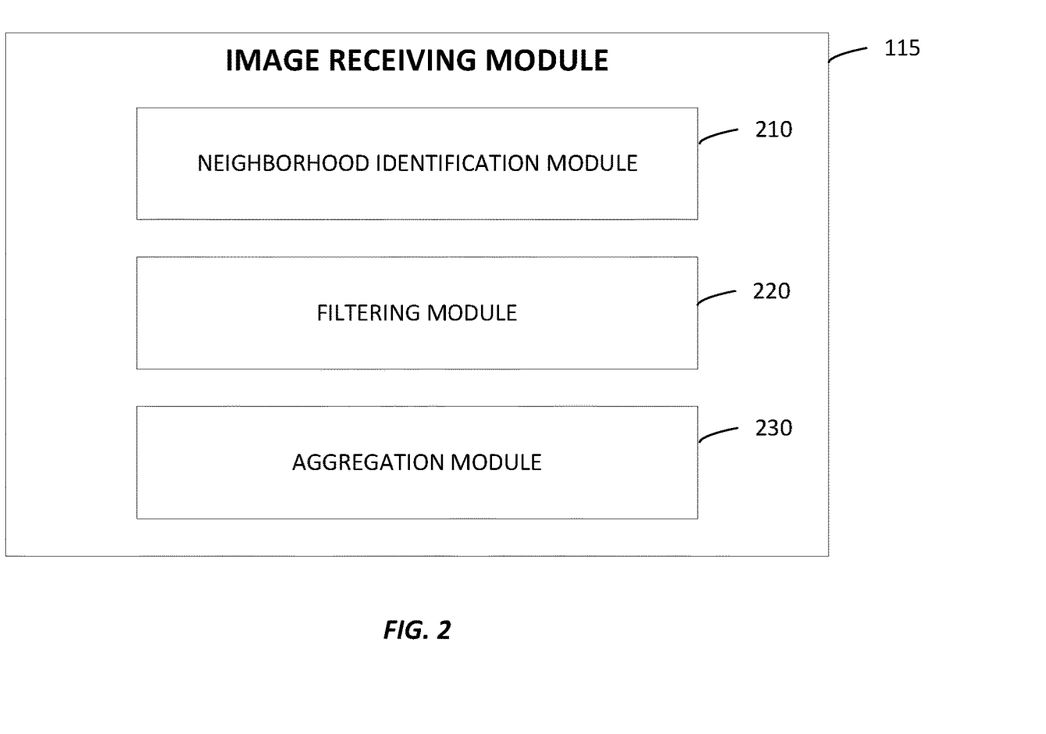
FIG. 2 illustrates a block diagram detailing an exemplary embodiment of an image receiving module.

FIG. 2 is a block diagram detailing an exemplary embodiment of the image receiving module 115 according to the present disclosure. The image receiving module 115 may include a neighborhood identification module 210, a filtering module 220 and an aggregation module 230. The neighborhood identification module 210, filtering module 220 and aggregation module 230 may be separate modules or may be combined and may interact with each other and/or with other software, hardware, and/or firmware.

The neighborhood identification module 210 may identify a neighborhood with a concentration of properties insured by an insurance provider that is above a predetermined concentration threshold. For example, the predetermined concentration threshold may be 20 percent of properties. Neighborhoods may be identified by selecting a set of boundaries which encapsulate the neighborhood and determine the number of properties which are insured by the insurance provider as compared to the number of properties which are not insured by the insurance provider within the set of boundaries. For example, the set of boundaries may be GPS coordinates or alternatively a radius may be specified from a center point within the neighborhood. In any event, when a neighborhood is identified with a concentration of insured properties that exceeds the concentration threshold, the underwriting evaluation module 72 may request and/or receive aerial images of the identified neighborhood. For example, the underwriting evaluation module 72 may receive the aerial images of the identified neighborhood from the satellite device 18 of FIG. 1A, the MAV, or from the UAV(s) 40. The aerial images may be received from the UAV(s) 40 by automatically directing the one or several UAV(s) 40 to fly within the set of boundaries which encapsulate the identified neighborhood. The UAV(s) 40 may also be directed to take several photographs at different locations within the neighborhood and at several angles. Alternatively, after the neighborhood is identified, a user such as an insurance agent may control the UAV(s) 40 remotely, through a series of user controls on the remote user interface 30 to cause the UAV(s) to take pictures at different locations within the neighborhood and at several angles.

After the aerial images are captured and received for the identified neighborhood, the underwriting evaluation module 72 may use the filtering module 220 to filter out aerial images that do not display insured properties, and to group together all of the aerial images which display a single insured property. For example, the filtering module 220 may use the customer data and the location data stored in the data storage entity 116 or the customer database 66 and the location database 68 of the server 14 to determine the locations of insured properties. The locations of insured properties may be compared to a received aerial image which contains GPS coordinates of its data points, as described above, to determine whether the received aerial image displays an insured property. For example, if the location of the aerial images matches with one of the locations of the insured properties then the aerial image displays an insured property. If the received aerial image does not display any insured properties the aerial image may be discarded. Otherwise, the filtering module 220 may group the remaining received aerial images with other aerial images which display the same insured property. In some embodiments, an aerial image may display more than one insured property. In this instance, the aerial image may be grouped with each of the insured properties that the image displays.

Each group of aerial images which displays the same insured property may be combined using an aggregation module 230. The group of aerial images may be combined to generate a 3D image of the insured property using 3D imaging techniques such as stereoscopy or photogrammetry. The aggregation module 230 may utilize the Cartesian or GPS coordinates received with each aerial image to reconstruct a 3D image of the insured property using the group of aerial images captured at different locations and angles. The aggregation module 230 may combine each group of aerial images to generate a 3D aerial image of each insured property in the neighborhood.

Figure 3:
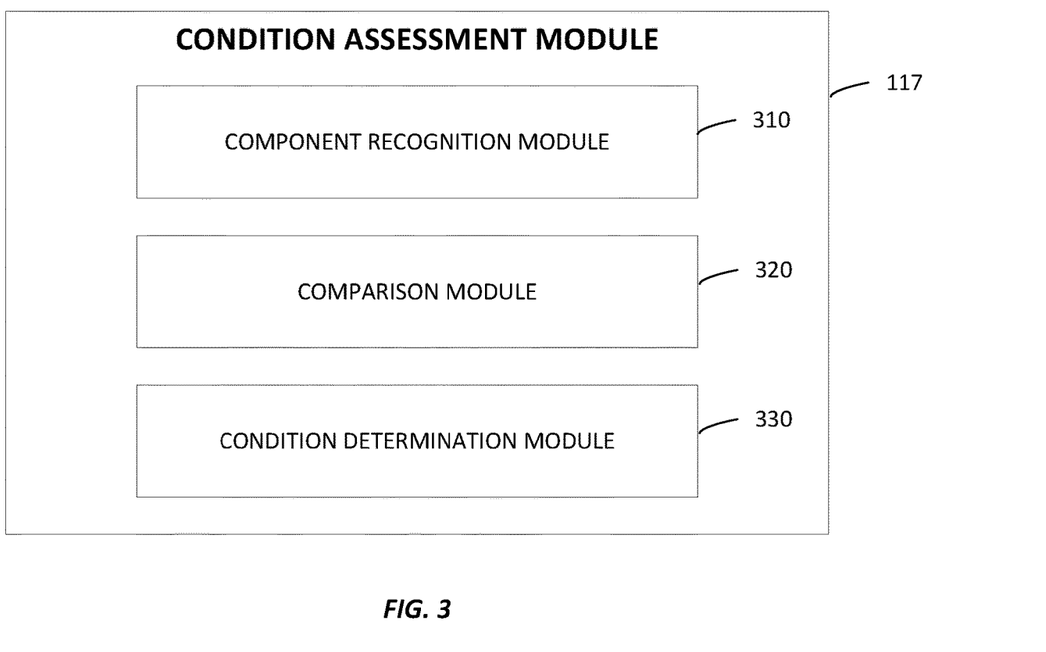
FIG. 3 depicts a block diagram detailing an exemplary embodiment of a condition assessment module.

FIG. 3 is a block diagram detailing an exemplary embodiment of the condition assessment module 117. The condition assessment module 117 may include a component recognition module 310, a comparison module 320 and a condition determination module 330. In some embodiments, the condition assessment module 117 may obtain a 3D aerial image of an insured property and determine the condition of the insured property. In other embodiments, the condition assessment module 117 does not obtain 3D aerial images and instead obtains 2D aerial images. Moreover, in some embodiments, the 3D aerial image may be obtained from the image receiving module 115. The condition assessment module 117 may obtain one 3D aerial image of an insured property at a time or alternatively may obtain several 3D aerial images depicting each of the insured properties in a neighborhood.

In any event, the component recognition module 310 may determine property components of a 3D aerial image of an insured property. Property components may include a roof, a door, a window, siding, exterior walls, a lawn, a backyard, an outdoor swimming pool, a fence, a tree, a deck, a patio, etc. The component recognition module 310 may determine a portion of the 3D aerial image of the insured property which displays a particular property component. For example, the component recognition module 310 may determine a door of the insured property by determining the data points in the 3D aerial image which include the door. Various image processing techniques such as edge detection may be used by the component recognition module 310 for determining the data points of a 3D aerial image which depict a particular property component.

Once the property components are determined for a 3D aerial image or for several 3D aerial images in a neighborhood, each property component may be compared with other predefined property components using the comparison module 320. The comparison module 320 may compare the data points of a property component with data describing one or more predefined property components corresponding to the same property component. If the property component is a roof, for example, the comparison module 320 may compare data extracted by the component recognition module 310 with previously stored images of brand-new "stock" tiles and of an intact roof. Based on these comparisons, the comparison module 320 may determine physical differences between the roof depicted in the data points and the stock components (e.g., brand new roof tiles). For example, the comparison module 320 may determine that the data points depicting the roof differ in color (e.g., due to weather aging), thickness (e.g., due to cracks or dents in the surface), and/or in height/width (e.g., due to chipping on one or more edges) from the brand-new "stock" tiles.

Moreover, the comparison module 320 may also compare the data depicting a roof with a previously stored image of the same roof, for example, from five years ago. The previously stored image of the same roof may be obtained from the previous image data 94 stored at the server 14 or the client device 12 of FIG. 1A. After an aerial image of insured property is captured, the aerial image may be stored in the previous image data 94, so that it may be compared with a newly captured image of the same property at a later date. In this manner, the degradation/maintenance of an insured property or of a property component may be determined over time for a more detailed analysis of the level of risk of the insured property. Moreover, the aerial images may display the presence of new rooms or structures which were not present in the previous aerial images of the insured property. This may allow the system to detect additional risk as compared to the previous state of the insured property during the re-underwriting process. Comparing the newly captured images of the insured property to previously captured images may also allow the system to determine the age of property components, e.g., the aerial images may display the roof being replaced ten years ago.

After comparisons have been made for each property component in an insured property or in a neighborhood, a condition determination module 330 may determine the condition of each property component based on the comparison. Conditions may include condition categories such as "poor," "fair," "moderate," "good," "excellent," etc., or may include numerical condition scores, for example from a scale of one to one hundred. For example, with reference to the roof example described above, a roof having several cracks or dents in the surface may be determined to be in poor condition.

Figure 4:
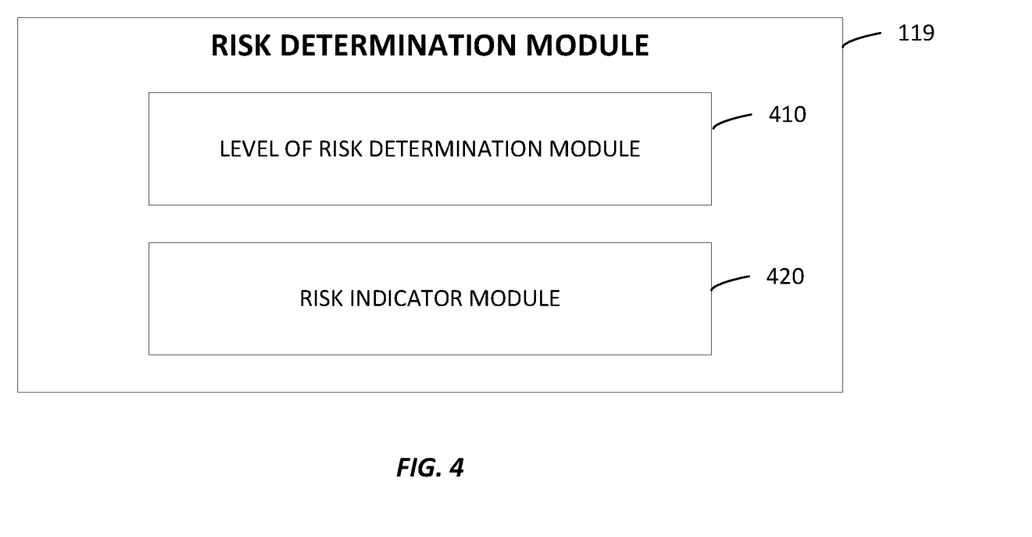
FIG. 4 depicts a block diagram detailing an exemplary embodiment of a risk determination module.

Each property component along with the respective condition determined for each property component may then be provided to a risk determination module, such as the risk determination module 119 as depicted in FIG. 4. The risk determination module 119 may include a level of risk determination module 410, and a risk indicator module 420. The level of risk determination module 410 may determine that a property component belongs to a particular level of risk category from a set of level of risk categories. For example, the set of level of risk categories may include "low," "moderate," "high," "liability," "very low," "very high," etc. In other embodiments, the level of risk determination module 410 may determine a level risk score for a property component, such as a numeric level of risk score on a scale from one to ten.

In any event, the level of risk determination module 410 may determine the level of risk for a property component based, at least in part, on the condition of the property component. For example, a door in poor condition may have a higher level of risk than a door in excellent condition. However, the condition of the property component may not be the only factor considered by the level of risk determination module 410 for determining the level of risk. The maintenance of the property component may also be used for determining its level of risk. For example, a roof in moderate condition that has been in the same moderate condition for 15 years and has not worsened may have a lower level of risk than a roof in moderate condition for the first time. On the other hand, the level of risk may be higher for the roof that has been in moderate condition for 15 years because it may be more likely that the roof will be downgraded to poor condition than the roof in moderate condition for the first time. The type of property component may also be a factor for determining the level of risk, regardless of the property component's condition. For example, a swimming pool may pose a high level of risk even if it is kept in excellent condition, because of the liability risk associated with a swimming pool. Moreover, a gas line in a home or a forest in a backyard may pose fire risks even when they are properly maintained. However, this is merely an exemplary list of factors which may be considered by the level of risk determination module 410 for determining the level of risk. Any number of additional factors may also be considered and some of the factors mentioned above may be omitted by the level of risk determination module 410. In some embodiments, the level of risk determination module 410 may include a set of rules which may be used for each property component to determine its level of risk. The set of rules may include the factors mentioned above or any number of additional factors. In some embodiments, the set of rules may include combining and/or aggregating the factors which are applied to a property component to determine a level of risk for the property component. In an embodiment, the set of rules may be determined based on heuristics, best practices and/or statistical data.

In any event, once the level of risk is determined for each property component or alternatively once the level of risk is determined for a single property component, the risk indicator module 420 may assign a level of risk indicator to each property component. For example, each level of risk category from the set of level of risk categories may be assigned a respective level of risk indicator. More specifically, the "moderate" risk category may correspond to the color yellow, for example. Moreover, the "high" risk category may correspond to the color red, and the "low" risk category may correspond to the color green. In other embodiments, a range of level of risk scores may be assigned a level of risk indicator. For example, level of risk scores between 1 and 3 may correspond to the color green. The corresponding level of risk indicators may then be assigned to each property component based on the determined level of risk for the property component. For example, a piece of siding with a moderate level of risk may be assigned the color yellow. An assigned level of risk indicator for a property component may then be appended to one or more aerial images which may be 3D aerial images and which display the property component. For example, an aerial image displaying the piece of siding may display the color yellow overlaying the piece of siding.

While the level of risk indicators are described as the colors red, green and yellow, the indicators are not limited to those particular colors. Instead, the level of risks indicators may include any color and also may include any other suitable representation of a level of risk. For example, level of risk indicators may include numbers which are placed over each property component, may include labels which indicate the level of risk category for each property component, may include symbols which indicate the level of risk category for each property component, may include different shading techniques which indicate the level of risk category for each property component, etc.

The aerial images which display insured properties and include level of risk indicators may then be displayed on the client device 12 for an insurance agent to view. In some embodiments, the client device 12 may display a 3D aerial image of an insured property with level of risk indicators overlaying each property component. Moreover, in some embodiments, the client device 12 may display several aerial images for a single insured property and include the level of risk indicators for each property component. As mentioned above, some aerial images may display more than one insured property and as a result, may be included in both sets of aerial images which display a first and a second insured property, respectively.

In some embodiments, the underwriting evaluation module 72 may include a set of rules for determining an insurance premium based on the levels of risk of the various property components corresponding to an insured property. For example, the underwriting evaluation module 72 may aggregate and/or combine the level of risk categories or the level of risk scores to determine an overall level of risk. The overall level of risk may be used to determine an appropriate insurance premium. In other embodiments, an insurance agent or a user of the client device 12 may view the levels of risk of the various property components to determine the appropriate insurance premium for the insured property.

Figure 5:
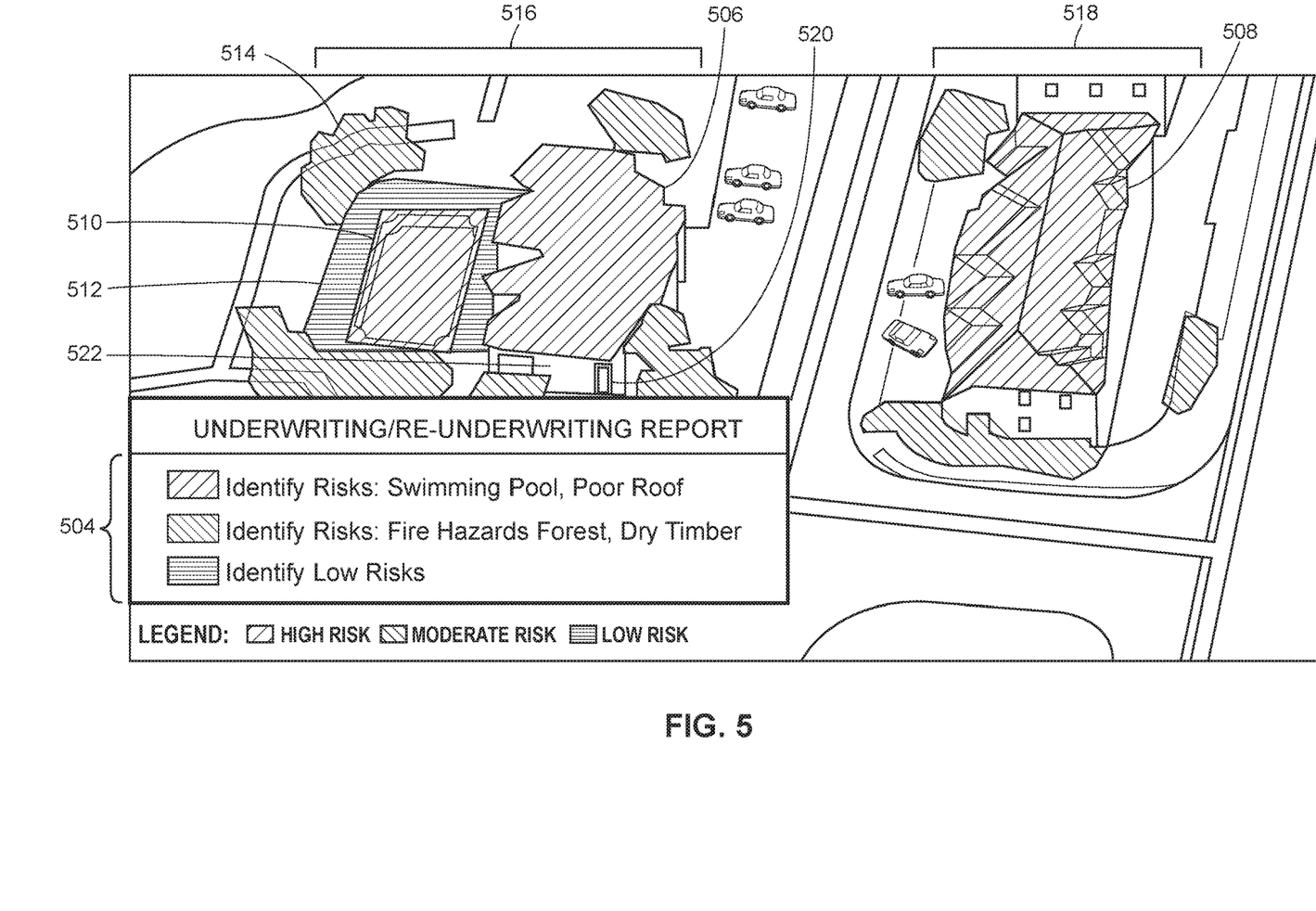
FIG. 5 depicts an exemplary display of insured properties including level of risk indicators.

FIG. 5 illustrates an exemplary display 500 from an aerial image of insured properties including level of risk indicators. In some embodiments, the display 500 may be presented on the image user interface 70 of the client device 12 of FIG. 1A. In other embodiments, the display 500 may be presented on another computing device. The display 500 may include a legend 502 which explains the meaning of each level of risk indicator present on the display 500. For example, the legend 502 explains a red color indicates "high risk," a yellow color indicates "moderate risk," and a green color indicates "low risk." Moreover, the display 500 may also include a key 504 describing the property components which were identified for each level of risk category. For example, the key 504 describes a swimming pool and poor roof are identified as high risk, a forest and dry timber are identified as moderate risk because they are considered fire hazards, and the area surrounding the pool is identified as low risk because of the liability associated with a wet deck or a pool.

Additionally, the display 500 may include two insured properties, a first insured property 516 and a second insured property 518. The display 500 of the first insured property 516 may include the property components: a roof 506, a swimming pool 510, a pool deck 512, a backyard 514, windows 520 and siding 522. The first insured property 516 may also include additional property components which may be shown more clearly in another display at a different angle, location and/or zoom level.

In any event, the roof 506 is identified as being in poor condition, which may be determined from the condition assessment module 117 of FIG. 3. As a result, the roof 506 in poor condition is identified as high risk which may be determined from the risk determination module 119 of FIG. 4, and assigned a red level of risk indicator. The red color is placed over the roof 506 on the display 500 to indicate high risk. Moreover, the swimming pool 510 is also assigned the red level of risk indicator to indicate high risk. While the key 504 does not explain that the swimming pool 510 is in poor or even moderate condition, the swimming pool 510 may be identified as high risk because of the inherent dangers associated with a pool, e.g., injuries in the pool, drowning, flooding, etc. The backyard 514 is identified as moderate risk and assigned a yellow level of risk indicator, because of the fire hazards associated with the forestry in the backyard 514. Further, the pool deck 512 is identified as low risk, because of the liability risks associated with a pool and the surrounding areas such as a wet deck.

The windows 520 and siding 522 are not identified as having any level of risk. This may be because of the excellent condition and/or maintenance. However, the windows 520 and siding 522 also may not be identified as having any level of risk because of the angle, location, and/or zoom level of the display 500. Other aerial images may capture a closer, more detailed version of the windows 520 and siding 522, and the display from those aerial images may include a level of risk.

The second insured property 518 also includes a red level of risk indicator assigned to the roof 508 as well as a yellow level of risk indicator assigned to the backyard because of the forestry. As mentioned above, each aerial image may be grouped into a set of aerial images which display a single insured property. In this instance, the aerial image of the display 500 may belong to the set of aerial images which display the first insured property 516 and to the set of aerial images which display the second insured property 518. Moreover, each insured property 516, 518 may include several aerial images which may be taken from different angles, at different zoom levels, and at different locations in order to capture the complete insured property. The aerial image of the display 500 may be just one of several images of the insured properties 516, 518.

Figure 6:
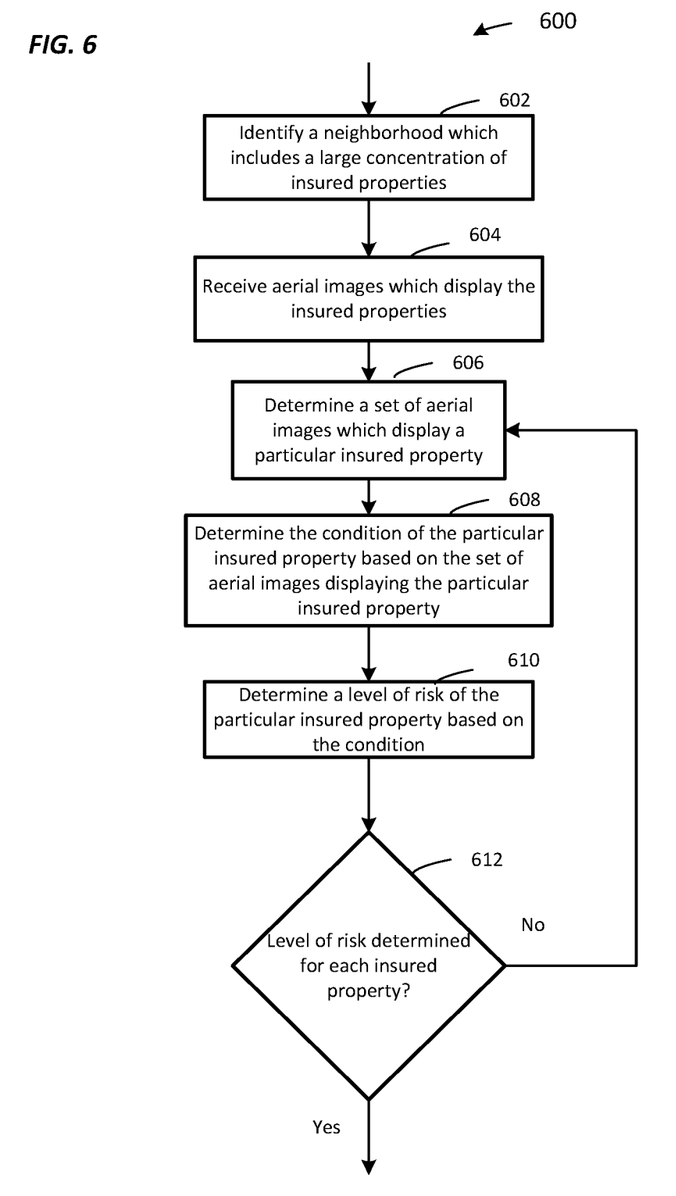
FIG. 6 illustrates a flow diagram representing an exemplary method for performing automatic insurance underwriting of insured properties in a neighborhood in accordance with the presently described embodiments.

FIG. 6 illustrates a flow diagram representing an exemplary method 600 for performing automatic insurance underwriting of insured properties in a neighborhood. The method 600 may be executed on the client device 12, the server computer 14 or some combination of the client device 12 and the server computer 14. For example, at least a portion of the method 600 may be performed by the underwriting evaluation module 72 of FIG. 1A which as mentioned above, may be disposed on the client device 12, the server computer 14 or some combination of the client device 12 and the server computer 14. In an embodiment, the underwriting evaluation module 72 may include computer-executable instructions stored on one or more non-transitory, tangible, computer-readable storage media or devices, and the computer-executable instructions of the underwriting evaluation module 72 may be executed to perform the method 600.

At block 602, a neighborhood may be identified which includes a large concentration of insured properties. In some embodiments, the neighborhood may be identified by comparing its concentration of insured properties to a predetermined threshold. For example, neighborhoods having more than 20 percent of properties insured by the same insurance provider may be identified as having a large concentration of insured properties. Neighborhoods may be identified by selecting a set of boundaries which encapsulate the neighborhood and determining the number of properties which are insured by the insurance provider as compared to the number of properties which are not insured by the insurance provider within the set of boundaries. For example, the set of boundaries may be GPS coordinates or alternatively a radius may be specified from a center point within the neighborhood.

Then, aerial images which display the insured properties in the neighborhood may be received (block 604). The aerial images may be received from the satellite device 18, the MAV, or the UAV(s) 40 of FIG. 1A. In some embodiments, user controls may be disposed on the client device 12 which allow a user, such as an insurance agent, to control the UAV(s) 40 remotely and determine when and where to capture aerial images. In other embodiments, the UAV(s) 40 may be preprogrammed to capture aerial images at specified locations. Additionally, in some embodiments, the satellite device 18 or the UAV(s) 40 may capture aerial images of the entire neighborhood. A filter such as the filtering module 220 of FIG. 2 may only allow those aerial images which display an insured property to pass through the filter based on the location of each aerial image.

At block 606, the underwriting evaluation module 72 may determine a set of aerial images which display a particular insured property of the several insured properties in the neighborhood. For example, the location of the particular insured property may be determined. Then each aerial image which displays the same location as the insured property may be grouped into the set of aerial images which display the particular insured property. In some embodiments, when an aerial image displays more than one insured property, the aerial image is grouped into the set of aerial images for each insured property it displays. Moreover, in some embodiments, the set of aerial images may be aggregated to form a 3D display of the particular insured property. For example, the set of aerial images may be aggregated using photogrammetry techniques to create the 3D image.

Then, the condition of the particular insured property may be determined based on the set of aerial images which display the particular insured property (block 608). In some embodiments, the particular insured property may be divided into several property components and a condition may be determined for each property component. The condition may be determined by comparing the property component to a previous image of the property component taken at an earlier date. Additionally, the condition may be determined by comparing the property component to a similar property component in good condition and identifying differences between the two. Moreover, the condition may be determined based on the age of the particular insured property, the level of maintenance of the particular insurance property, changes to the particular insured property, etc. In an embodiment, an overall condition of the insured property may be determined based on the condition of each property component.

Based at least in part on the condition of the particular insured property, a level of risk may be determined (block 610). For example, a level of risk score or a level of risk category may be determined for each property component of the particular insured property. The level of risk score or category may be determined for a property component based on the condition of the property component, the level of maintenance of the property component, inherent dangers associated with the property component, etc. Additionally, the level of risk score or category may be determined using a set of rules. A level of risk indicator may then be assigned to each property component based on the determined level of risk. Moreover, in some embodiments, the level of risk indicators may be displayed along with a display of the aerial images for the particular insured property, for example, on the client device 12.

At block 612, the underwriting evaluation module 72 may determine whether or not a level of risk has been determined for all of the insured properties in the neighborhood. If a level of risk has not been determined for every insured property, the method 600 continues at block 606 and a set of aerial images which display another insured property in the neighborhood is determined. Otherwise, if a level of risk has been determined for every insured property, the process ends.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A method for determining the condition of insured properties using aerial images, the method executed by one or more processors programmed to perform the method, the method comprising:
   identifying, by the one or more processors, that a neighborhood includes properties insured by an insurance provider;
   capturing, by an aerial image capturing device, a plurality of aerial images which display the neighborhood including the insured properties;
   receiving, at the one or more processors, a plurality of aerial images from the aerial image capturing device; and
   for each of the insured properties in the identified neighborhood:
      determining, by the one or more processors, a condition of the insured property based on one or more of the plurality of aerial images corresponding to the insured property;
      determining, by the one or more processors, a level of risk of the insured property based on the condition of the insured property and a change in the condition of the insured property over time, wherein the level of risk of the insured property differs according to a length of time that the insured property is in a particular condition;
      assigning, by the one or more processors, a level of risk indicator to the insured property based on the determined level of risk; and
      causing, by the one or more processors, the insured property to be displayed on a user interface including the level of risk indicator overlaying the insured property;
   wherein the one or more processors automatically direct the aerial image capturing device to capture the plurality of aerial images which display the neighborhood.

2. The method of claim 1, further comprising:
   determining, by the one or more processors, a location of each of the received plurality of aerial images; and
   filtering, by the one or more processors, the plurality of aerial images based on the determined locations to determine a subset of the plurality of aerial images, wherein each aerial image in the subset displays at least one insured property; and for each of the insured properties in the identified neighborhood, determining one or more aerial images of the subset of the plurality of aerial images which display at least a portion of the insured property.

3. The method of claim 1, wherein the aerial image capturing device is an unmanned aerial vehicle.

4. The method of claim 3, further comprising:
directing, by the one or more processors, the unmanned aerial vehicle to one or more locations for capturing the plurality of aerial images.

5. The method of claim 1, wherein assigning the level of risk indicator to the insured property includes assigning a first level of risk indicator corresponding to a first portion of the insured property, and assigning a second level of risk indicator corresponding to a second portion of the insured property, wherein the second level of risk indicator is different from the first level of risk indicator.

6. The method of claim 1, further comprising:
for each of the insured properties in the identified neighborhood, aggregating the respective one or more aerial images corresponding to the insured property to generate a three dimensional display of the insured property on a user interface; and
wherein determining the condition of the insured property includes determining the condition of the insured property based on the three dimensional display.

7. The method of claim 1, wherein determining the condition of the insured property includes determining a separate condition for one or more property components of the insured property.

8. The method of claim 7, wherein the one or more property components include at least one of: a window, a door, a roof, siding, an exterior wall, a garage, a backyard, a swimming pool, a lawn, a driveway, a fence, a tree, a deck, or a patio.

9. The method of claim 1, wherein the aerial image capturing device includes one or more stabilization sensors which control aerial movement of the aerial image capturing device and an image sensor.

10. The method of claim 1, wherein determining the change in the condition of the insured property over time includes comparing the respective one or more aerial images corresponding to the insured property to one or more historical images of the insured property, wherein the historical images were captured before the respective one or more aerial images.

11. The method of claim 10, wherein determining the condition of the insured property includes determining at least one of: an age of the insured property or a level of maintenance for the insured property.

12. A system for determining the condition of insured properties in a neighborhood, the system comprising:
an aerial image capturing device which captures a plurality of aerial images that display insured properties;
a user interface;
a communication network; and
one or more computing devices communicatively coupled to the communication network, the aerial image capturing device, and the user interface, each of the one or more computing devices having a memory and one or more processors and at least one of the computing devices configured to:
identify that a neighborhood includes properties insured by an insurance provider;
receive a plurality of aerial images via the communication network from the aerial image capturing device; and
for each of the insured properties in the identified neighborhood:
determine a condition of the insured property based on one or more of the plurality of aerial images corresponding to the insured property;
determine a level of risk of the insured property based on the condition of the insured property and a change in the condition of the insured property over time, wherein the level of risk of the insured property differs according to a length of time that the insured property is in a particular condition;
assign a level of risk indicator to the insured property based on the determined level of risk; and
cause the insured property to be displayed on the user interface including the level of risk indicator overlaying the insured property;
wherein the at least one computing device automatically directs the aerial image capturing device to capture the plurality of aerial images which display the neighborhood.

13. The system of claim 12, wherein the at least one computing device is further configured to:
determine a location of each of the received plurality of aerial images; and
filter the plurality of aerial images based on the determined locations to determine a subset of the plurality of aerial images, wherein each aerial image in the subset displays at least one insured property; and
for each of the insured properties in the identified neighborhood, determine one or more aerial images of the subset of the plurality of aerial images which display at least a portion of the insured property.

14. The system of claim 12, wherein the aerial image capturing device is an unmanned aerial vehicle.

15. The system of claim 14, wherein the at least one computing device is further configured to:
direct the unmanned aerial vehicle to one or more locations for capturing the plurality of aerial images.

16. The system of claim 14, wherein the at least one computing device is further configured to:
display one or more user controls on the user interface configured to receive directions for navigating the unmanned aerial vehicle.

17. The system of claim 12, wherein to assign the level of risk indicator to the insured property, the at least one computing device is configured to assign a first level of risk indicator corresponding to a first portion of the insured property, and assign a second level of risk indicator corresponding to a second portion of the insured property, wherein the second level of risk indicator is different from the first level of risk indicator.

18. The system of claim 12, wherein the at least one computing device is further configured to:
for each of the insured properties in the identified neighborhood:
aggregate the respective one or more aerial images corresponding to the insured property to generate a three dimensional display of the insured property on the user interface; and
wherein to determine the condition of each insured property, the at least one computing device is configured to determine the condition of the insured property based on the three dimensional display.

19. The system of claim 12, wherein to determine the condition of each insured property, the at least one computing device is configured to determine a separate condition for one or more property components of the insured property.

20. The system of claim 12, wherein the aerial image capturing device includes one or more stabilization sensors which control aerial movement of the aerial image capturing device and an image sensor.

* * * * *